Patented May 20, 1941

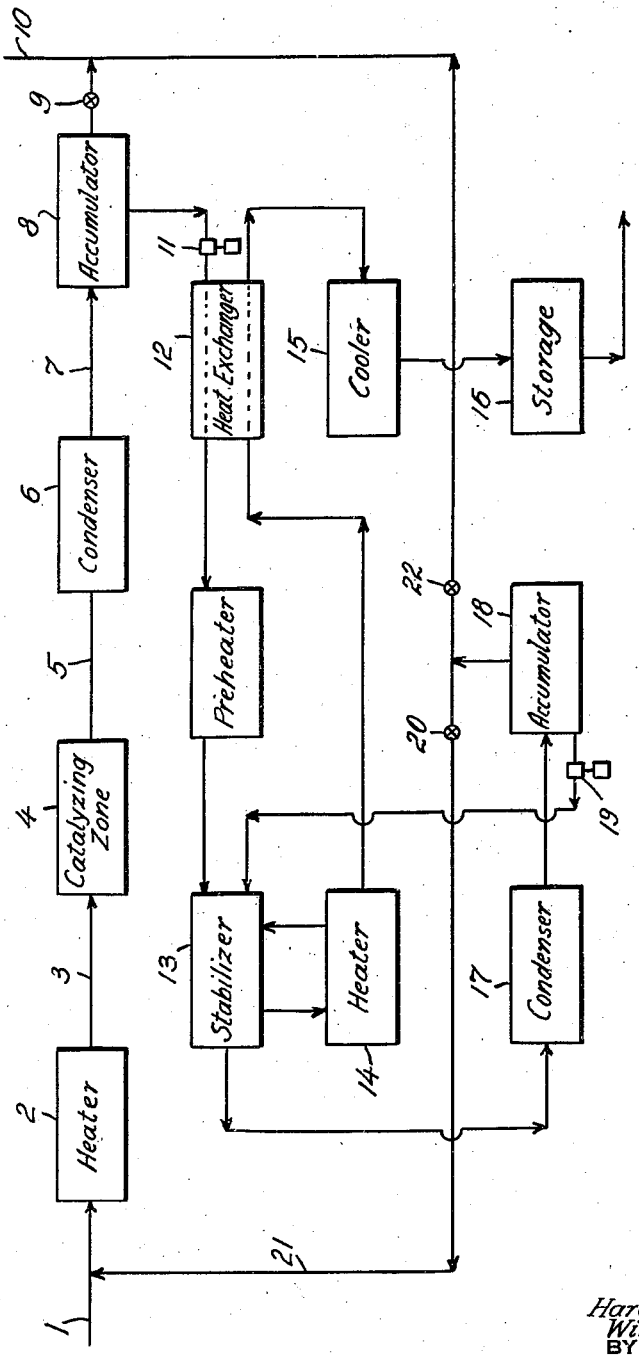

2,242,771

UNITED STATES PATENT OFFICE 2,242,771

METHOD OF OPERATING POLYMERIZATION PLANTS

Harold J. Baker, Jr., Flossmoor, Ill., and William Mendius, Munster, Ind., assignors to Sinclair Refining Company, New York, N. Y., a corporation of Maine Application June 23, 1937, Serial No. 149,862

4 Claims. (Cl. 196—10)

This invention relates to the processing treatment of hydrocarbon mixtures containing olefins. The invention provides an improved process for the production of polymerized olefins from hydrocarbon gas mixtures containing olefins with increases in the efficiency and flexibility of operation in the production of the polymerized olefins.

With the automobile and airplane industries producing motors having progressively higher compression ratios and greater speeds, the oil industry has been called upon to produce motor fuel gasoline making it possible for these motors to function properly. The gasoline required for the modern motor is characterized by a higher anti-knock value (commonly stated as octane rating at the present time) than has heretofore been demanded. The oil industry has met this demand for relatively high octane gasoline to a large extent by polymerizing gaseous olefins occurring in gases produced during pyrolytic conversion of petroleum or during pyrolytic decomposition of natural gas.

One general form of polymerization process comprises heating the olefin-bearing gases in a furnace to a temperature of about 450° F. and under pressure of the order of 200 lbs. per square inch, and flowing the heated gases over a suitable catalyst arranged in catalyst chambers, usually in series. A condensation or polymerization of the olefins present in the gases takes place with the formation of a normally liquid product and a normally gaseous product. The time, temperature, and pressure are so controlled that the products of the catalytic reaction boil within the gasoline range. A small quantity of steam is usually added, continuously, to the gases passing through the process, this steam serving to prevent dehydration of the catalyst under the operating conditions. The heat liberated by the polymerization of the olefins normally increases the temperature in the catalyst chambers to about 500 to 550° F. The products of the reaction are passed through a condensing coil and the polymer gasoline is drawn from the bottom of a receiver while the lean deolefinized gas flows from the top of the receiver to be mixed with refinery fuel gas or suitably disposed of in some other manner. The polymer gasoline is pumped to a stabilizer comprising a stabilizing tower which is so controlled as to produce a product of the desired vapor pressure.

After continued operation, the catalyst gradually loses its activity, a result which is caused primarily by a deposit of carbonaceous material. To reactivate the catalyst to its original state, the carbonaceous material is removed, usually by oxidation of the carbonaceous deposit to water and carbon dioxide by passing a stream of combustion gases containing limited percentages of oxygen over the catalyst. After the oxidation or burning of the carbonaceous material has been completed, it is necessary to hydrate the catalyst to the proper degree so as to produce the maximum activity of the catalyst.

The efficiency of this catalytic process for the polymerization of gaseous olefins is seriously impaired if the rate at which the process gas is passed through the system is appreciably below the capacity for which the system was designed. Such a condition brings about subnormal gas velocity through the catalyst bed. Proper contact time is necessary to obtain the desired degree of polymerization, and for a given plant design a definite velocity must be maintained to provide this optimum contact time. A subnormal gas velocity further tends to build up the carbonaceous deposit on the catalyst and hence diminsh the active period of the catalyst. A low gas velocity through the catalyst bed also tends to promote channeling therein.

Moreover, this catalytic process for the polymerization of gaseous olefins cannot be operated efficiently if the content of the higher olefins in the process gas is too high. By "higher olefins" is meant those olefins containing three or more carbon atoms per molecule. This excessive concentration of higher olefins is detrimental to efficient operation in several respects. For example, an excess of higher olefins over the optimum concentration produces excessive temperature rises throughout the catalyst bed necessitating the addition of larger quantities of moisture in order to maintain the catalyst at its maximum activity. The desired control of moisture content of the catalyst becomes more difficult with an increased temperature differential between different parts of the catalyst bed, thus resulting often in an insufficient or excessive quantity of moisture which is passed through separate portions of the catalyst bed. An increase over the optimum moisture content in the catalyst brings about corrosive conditions which may seriously diminish the life of the equipment. A decreased moisture content, as compared to the optimum desired, causes a decrease of catalyst activity. A wide temperature differential in the catalyst bed is disadvantageous, therefore, for the reason that dehydration of the catalyst takes place in the hottest zones within the bed and over-hydration occurs in the coolest zones with a given moisture content in the gaseous charge to the plant. Furthermore, an excessive concentration of higher olefins in the process gas causes an increase in the reaction intensity, thereby increasing the rate of carbonaceous deposition on the catalyst which, in turn, shortens the active period of the cataly.

The combined effect of these several factors is cumulative. Each of the above-mentioned conditions tends to shorten the duration of the active life of the catalyst and hence to shorten the duration of the useful period of operation. The diminished period of useful operation has as a concomitant an increased number of reactivations of the catalyst over a given period of time and also involves an increase in the necessary intensity of this reactivation. More frequent reactivations and increased intensity of reactivations markedly decrease the life of the catalyst. An increase in the frequency of reactivations necessitates a greater number of upsets and interruptions in the operation of the polymerization process.

We have found that the recycling of a controlled volume of gas lean with respect to its content of higher olefins through the polymerization unit together with the fresh process gas has the effect of nullifying these several difficulties hereinbefore enumerated. The lean gas may be obtained from the polymerization process itself or from a suitable extraneous source. Thus, the expression "recycling" is used herein in a broad sense to include not only the return of lean gas from the polymerization process but the introduction into the operation of a gas obtained from an extraneous source and lean with respect to its content of higher olefins. The lean gas returned from the polymerization process may comprise that gas which is released from the polymer gasoline accumulator or that gas which is released from the polymer gasoline stabilizer, or a mixture of both.

By means of this recycling, the gas velocity through the catalyst bed may be increased thus reducing deposition of carbonaceous material and imparting greater flexibility to the polymerization process. Inasmuch as the higher olefins are more readily polymerized and hence more completely removed from the process gas, the gas which is recycled from the polymerization process is materially lower in its content of the higher olefins as compared to the fresh process gas, the extent to which this recycle gas is lower in its content of higher olefins being dependent upon the efficiency of the catalytic operation. The fresh process gas being diluted with the recycle gas, the reaction intensity in the catalyst bed is decreased, thus resulting in turn in greater facility of control of the optimum state of catalyst hydration. Moreover, the recycling of lean gas permits a closer control of the time factor which is so essential in a catalytic polymerization operation.

More particularly, our invention in its now preferred form comprises returning at least a portion of uncondensed gaseous mixture from the polymerization process for introduction into the catalyzing operation together with fresh olefin-bearing gases. This uncondensed gaseous mixture may comprise with advantage a substantial part of the gases which are not condensed in the stabilizing operation and which are lean with respect to their content of gaseous olefins.

The process of our invention may be more fully understood by a consideration of the flow diagram shown in the drawing in which lean gas is recycled from the polymer gasoline stabilizer accumulator. The fresh process gas flows through line 1 into heater 2 where the gas is raised to the correct temperature for the desired operation. The heated gas flows from heater 2 through line 3 into a series of catalyst towers in catalyzing zone 4, thence through outlet line 5, a condenser 6, through line 7, and into an accumulator 8. The lean deolefinized gases are released through a suitable back-pressure valve 9 into line 10, the release being so regulated as to maintain a constant pressure of the desired magnitude on the system. The liquid in the accumulator is forced by pump 11 through heat exchanger 12 and a preheater into a stabilizing chamber 13. The vapor pressure of the stabilized polymer gasoline is regulated at a specific operating pressure by controlling the amount of heat supplied to the gasoline as it it circulated through a heater 14, or equivalent means. A regulable portion of the polymer gasoline is passed from the heater through suitable cooling means, such, for example, as heat exchanger 12 and cooler 15, thence into a storage tank 16. The well fractionated light ends contained in the stabilizer feed pass through a suitable condenser 17 into an accumulator 18. Reflux circulation to stabilizing chamber 13 is maintained by a pump 19. The uncondensed gas mixture released from the stabilizer accumulator 18 and lean with respect to its content of gaseous olefins are then in part returned to give optimum results, as will be readily determined by one skilled in the art, through valve 20 and line 21 into line 1 for recycling through the catalyzing zone. The uncondensed gas mixture comprising the light ends which are not desired for recycling may be released through a suitable back-pressure valve 22 into line 10. The back-pressure valve 22 should be so regulated as to maintain a pressure upon the accumulator 18 which is substantially higher than the pressure at the inlet of the process gas heater in order that the uncondensed gaseous olefins from the stabilizer accumulator may be passed directly into the process gas heater.

Our invention will now be further illustrated in its application to the actual operation of a polymerization process although it must be understood that our invention is not limited to the following specific application. The release gas from an absorption plant stabilizer containing approximately 35% higher olefins (that is olefins having three or more carbon atoms per molecule) and in an amount of approximately 1,720,000 cu. ft. per day is forced through line 1 by means of the absorption plant stabilizer pressure. This pressure is about 160 pounds per sq. inch, and the release gas is introduced at a temperature of about 150° F. Approximately 560,000 cu. ft. per day of polymerization plant stabilizer release gas containing about 14% of higher olefins are introduced through line 21 into the fresh stock admitted through line 1. The resulting mixture containing approximately 30% higher olefins flows through the heater 2 in which the temperature of the mixture is raised to a predetermined temperature within the range of substantially 360° F. to 430° F. The lowest temperature in this range is satisfactory where the mixture of gases is to be introduced into a polymerization tower containing a new or freshly activated catalyst charge. The highest temperature within the foregoing specified range is used with advantage where the mixture of gases is to be introduced into a tower containing relatively spent inactive catalyst.

In order to maintain the proper state of hydration of the catalyst, distilled water is forced into line 1 in an amount of about 130 gallons of distilled water per day so that the gaseous mixture leaving the heater 2 will contain about 1% of steam.

The heated gas thus having the proper moisture content flows from heater 2 through line 3 into the catalyst zone 4 comprising three towers connected in series. The gaseous mixture flows first through the tower containing the most active catalyst and thence through the towers containing the progressively less active catalyst. The gases from the catalyst zone then pass through line 5, into a condenser 6, through line 7, and into the polymer gasoline accumulator 8. Approximately 422,000 cu. ft. per day of the uncondensed gases collected in the accumulator and lean with respective to higher olefins are released through the back-pressure valve 9 into fuel line 10. The back-pressure valve is so regulated as to maintain a pressure of approximately 155 pounds per square inch in the catalyzing zone. The liquid in the accumulator is forced by pump 11 through the heat exchanger 12 and a preheater into the stabilizing chamber 13. The stabilizing chamber is held under a pressure of approximately 200 pounds per sq. inch, and the liquid in the chamber is circulated through a heater which is maintained at about 265° F. Under these conditions the vapor in the top of the stabilizing chamber is at a temperature of approximately 140° F. About 402 barrels per day of a stabilized liquid having a Reid vapor pressure of approximately 31 pounds are drawn from the stabilizer heater through the heat exchanger 12, a cooler 15, and thence into the storage tank 16. The vapors contained in the stabilizer feed and which are well fractionated by the stabilizer tower are withdrawn from the stabilizer, passed through a condenser 17, and introduced into the accumulator 18. The reflux circulation of condensate from accumulator 18 to stabilizer 13 is maintained by the pump 19. Approximately 560,000 cu. ft. per day of the uncondensed gaseous mixture in the accumulator 18 are then released through valve 20 and line 21 into line 1 for recycling through the catalyzing zone. The remaining 756,000 cu. ft. per day of uncondensed gaseous mixture in the accumulator 18 is released through the back-pressure valve 22 into the fuel line 10. In order that the uncondensed gaseous mixture from the accumulator 18 can be passed directly into the line 1 against the pressure of fresh stock introduced through line 1, the back-pressure valve 22 is regulated to maintain a pressure in the accumulator 18 of approximately 200 pounds per square inch.

The regeneration of spent catalyst is effected by passing combustion gases at a temperature of 600° F. containing substantially no oxygen and not more than about 4% water vapor through the catalyst bed until the temperature of the catalyst bed reaches about 600° F. After the catalyst bed has attained this temperature, about 0.5% of oxygen or the equivalent amount of air is added to the combustion gases being passed through the catalyst bed. As the carbonaceous material deposited on the catalyst during the polymerization operation begins to burn off, the oxygen content of the combustion gases is controlled to produce a maximum temperature of about 950° F. in the catalyst bed. When the temperature of the catalyst bed drops substantially below 950° F. a larger quantity of oxygen or air is added to the combustion gases to maintain the temperature at about 950° F. This operation is continued with an increasing quantity of oxygen up to an amount represented by 75% of air in the combustion gases until the temperature of the catalyst bed decreases to approximately 600° F. The period which has elapsed from the time when excess oxygen or air is added to the combustion gases until the temperature of the catalyst bed drops substantially to the temperature of the heated combustion gases is considered the length of burning operation. After the catalyst has been restored to its proper state of hydration, an operation unnecessary to be described here, the catalyst may again be used in the polymerization operation.

The advantages which are obtained by the recycling operation of our invention will be readily apparent upon consideration of the following table which summarizes the results of a polymerization operation, such as that described, without recycling and a similar operation in which the released gas mixture lean with respect to its content of higher olefins was recycled to such an extent that the higher olefin content of the process gas was reduced to about 30%.

|  | Without recycle | With recycle |
|---|---|---|
| Higher olefin content of fresh process gas to plant _____per cent__ | 39 | 36 |
| Higher olefin content of gas to catalyst_____do____ | 39 | 30 |
| Yield of 10# RVP polymer/1000 cu. ft. of net gas charged_____gallons__ | 5.4 | 5.6 |
| Conversion of higher olefins in net charge to polymer _____per cent__ | 73 | 74 |
| Yield of 10# RVP polymer/lb. of catalyst before regeneration _____gallons__ | 6.1 | 7.8 |
| Temp. rise thru catalyst bed_____°F__ | 165 | 108 |
| Velocity ratios: |  |  |
| Net feed to catalyst zone __MM. cu. ft./day__ | 1.21 | 1.72 |
| Recycle feed_____do____ |  | .56 |
| Total feed_____do____ | 1.21 | 2.28 |
| Velocity increase in catalyst zone at entry percent__ |  | 33 |
| Service time/tower before regeneration_____days__ | 6 | 25 |
| Burning time/reactivation_____do____ | 3.8 | 3.1 |

From the foregoing tabulation it will be observed that in spite of a 3% reduction in the higher olefin content of the fresh process gas supplied to the polymerization plant, the recycling operation actually makes possible an increase of 0.2 gallons of polymer gasoline per 1000 cu. ft. of net charge. The conversion of higher olefins in the net charge to polymer gasoline was increased from 73 to 74%, while the yield of polymer gasoline per pound of catalyst before regeneration thereof was increased 28%. The temperature differential in the catalyst bed was lowered from 165° F. to 108° F. and the velocity of gas passing through the catalyst zone was increased 33% by the recycling operation. The time required for oxidation or burning of the carbonaceous deposit on the catalyst in the reactivation operation was decreased over 18%, whereas the length of the period between the necessary reactivations of the catalyst was increased from 6 days to 25 days. In addition to a prominent improvement in the efficiency of the polymerization operation, vast improvements are also realized in the efficiency and life of the catalyst as evidenced by the diminished length of reactivation time and the increase in length of the periods between necessary reactivations.

We wish to emphasize the fact that the concentration of higher olefins in the gaseous mixtures described in the foregoing specific example is not necessarily the optimum concentration of these olefins. The optimum concentration depends to a large extent upon the design of the polymerization plant which in turn affects the gas velocity, the contact time, and temperature differential through the catalyst zone. Our invention, therefore, should not be limited to its application to the process described above in which our invention has been demonstrated.

It will be observed that our invention not only overcomes the usual operating difficulties but promotes the flexibility of operation in a process of polymerizing gaseous olefins. Besides being particularly desirable in the ordinary polymerization operation, this flexibility is of particular advantage in a case where a polymerization plant is built oversize for future expansion with the result that the gas velocity through the plant would be too low and the optimum contact time could not be readily controlled. Greater flexibility is also desirable where the gas supply to a polymerization plant is temporarily or permanently curtailed or where the gas supply to the polymerization plant varies to a substantial degree in its content of higher olefins. Thus, under these and other unfavorable conditions, the flexibility of operation which may be imparted to a polymerization plant by the use of our invention leads to salient improvements in the operating efficiency of the plant.

We claim:

1. In the production of polymerized olefins wherein a heated gaseous mixture containing a substantial amount of normally gaseous higher olefins is passed at a temperature not substantially in excess of about 550° F. in contact with a catalyst, the product of the catalyzing operation is subjected to a stabilizing operation, and the product of the stabilizing operation is suitably condensed to form a liquid product and a composite gaseous product lean with respect to its content of higher olefins, the improvement which comprises returning at least a portion consisting of a controlled quantity of said composite lean gaseous product to the catalyzing operation, whereby a predetermined concentration of higher olefins is maintained in the catalyzing operation.

2. In the production of polymerized olefins wherein a heated gaseous mixture containing a substantial amount of normally gaseous higher olefins is passed at a temperature not substantially in excess of about 550° F. in contact with a catalyst and the product resulting from the catalyzing operation is subjected to fractional separation in a stabilizing chamber to form a liquid product and a composite gaseous product lean with respect to its content of higher olefins, the improvement which comprises withdrawing at least a portion consisting of a controlled quantity of the composite lean gaseous product of the stabilizing operation, and introducing said portion into the catalyzing operation together with fresh heated gaseous mixture containing a substantial amount of higher olefins, whereby a predetermined concentration of higher olefins is maintained in the catalyzing operation.

3. In the production of polymerized olefins wherein a heated gaseous mixture containing a substantial amount of normally gaseous higher olefins is passed at a temperature not substantially in excess of about 550° F. in contact with a catalyst and the product resulting from the catalyzing operation is subjected to fractional separation in a stabilizing chamber to form a liquid product and a composite gaseous product lean with respect to its content of higher olefins, the improvement which comprises withdrawing at least a portion consisting of a controlled quantity of the composite lean gaseous product, and returning said portion to the catalyzing operation, the return of said portion being so regulated as to produce a predetermined concentration of higher olefins in the catalyzing operation.

4. In the production of polymerized olefins wherein a heated gaseous mixture containing a substantial amount of normally gaseous higher olefins is passed at a temperature not substantially in excess of about 550° F. under pressure in contact with a catalyst and the product resulting from the catalyzing operation is subjected to fractional separation in a stabilizing chamber to form a liquid product and a composite gaseous product lean with respect to its content of higher olefins, the improvement which comprises withdrawing a portion consisting of a controlled portion of the composite lean gaseous product, introducing said portion into the catalyzing operation together with a fresh gaseous mixture containing a substantial amount of higher olefins, and maintaining a pressure in the stabilizing chamber substantially in excess of the pressure in the catalyzing operation, whereby a predetermined concentration of higher olefins is maintained in the catalyzing operation.

HAROLD J. BAKER, JR.
WILLIAM MENDIUS.

DISCLAIMER 2,242,771.—*Harold J. Baker, Jr.*, Flossmoor, Ill., and *William Mendius*, Munster, Ind. METHOD OF OPERATING POLYMERIZATION PLANTS. Patent dated May 20, 1941. Disclaimer filed June 22, 1945, by the assignee, *Sinclair Refining Company*.

Hereby enters this disclaimer to claims 1, 2, and 3 of said patent.

[*Official Gazette July 24, 1945.*]